(12) United States Patent
Negulescu et al.

(10) Patent No.: US 6,817,572 B2
(45) Date of Patent: Nov. 16, 2004

(54) AIR INTAKE SYSTEM OF A PROPELLER-TURBINE ENGINE

(75) Inventors: Dimitrie Negulescu, Berlin (DE); Christian Mundt, Eichwalde (DE)

(73) Assignee: Rolls-Royce Deutschland Ltd & Co KG, Dahlewitz (DE)

( * ) Notice: Subject to any disclaimer, the term of this patent is extended or adjusted under 35 U.S.C. 154(b) by 0 days.

(21) Appl. No.: 10/321,490

(22) Filed: Dec. 18, 2002

(65) Prior Publication Data

US 2003/0113205 A1 Jun. 19, 2003

(30) Foreign Application Priority Data

Dec. 18, 2001 (DE) .......................................... 101 62 238

(51) Int. Cl.⁷ .............................................. F02C 7/04
(52) U.S. Cl. ................................. 244/53 B; 137/15.1
(58) Field of Search ............................. 244/53 A, 53 B, 244/65; 60/39.092, 751; 137/15.1, 15.2

(56) References Cited

U.S. PATENT DOCUMENTS

| | | |
|---|---|---|
| 3,329,377 A | 7/1967 | Peterson et al. |
| 3,952,972 A | 4/1976 | Tedstone et al. |
| 4,250,703 A | 2/1981 | Norris et al. |
| 4,346,860 A | 8/1982 | Tedstone |
| 4,397,431 A | 8/1983 | Ben-Porat |
| 4,456,458 A * | 6/1984 | Gilbertson .................... 55/306 |
| 4,617,028 A | 10/1986 | Ray et al. |
| 4,796,424 A | 1/1989 | Farrar et al. |
| 4,881,367 A | 11/1989 | Flatman |
| 5,483,791 A | 1/1996 | Kotwal et al. |
| 5,725,180 A | 3/1998 | Chamay et al. |
| 6,129,509 A | 10/2000 | Cousin et al. |
| 6,293,494 B1 | 9/2001 | Scherer et al. |

FOREIGN PATENT DOCUMENTS

| | | |
|---|---|---|
| DE | 3439596 | 5/1985 |
| DE | 3731463 | 11/1997 |
| EP | 0997376 | 5/2000 |
| GB | 2058929 | 4/1981 |

* cited by examiner

Primary Examiner—Robert P. Swiatek
(74) Attorney, Agent, or Firm—Harbin, King & Klima

(57) ABSTRACT

An air intake system of a propeller-turbine engine with a propeller gearbox 1 in in-line arrangement, includes one or more intake units 3 arranged essentially below a nacelle fairing 2 of the propeller-turbine engine with each intake unit 3 being related to a elbow diffuser 19, a shock diffuser 4, and a rotationally symmetric attenuation chamber 5 into which the respective shock diffuser 4 issues and which is connected to the compressor inlet 6 of the propeller-turbine engine.

20 Claims, 3 Drawing Sheets

AIR INTAKE SYSTEM OF A PROPELLER-TURBINE ENGINE

This application claims priority to German Patent Application DE10162238.4, filed Dec. 18, 2001, the entirety of which is incorporated by reference herein.

BACKGROUND OF THE INVENTION

This invention relates to an air intake system of a propeller-turbine engine with an in-line arrangement of the propeller gearbox.

Various designs of propeller-turbine engines are known from the state of the art. These engines include a gas turbine and an upstream gearbox through which a propeller is driven.

The known designs are disadvantageous in that the size of the propeller gearbox and the bulkiness of the engine mounts typical of propeller-turbine engines necessitate a very large engine nacelle. The size of the engine nacelle is also influenced by the space required by the heat exchangers. In summary, the aerodynamic fairing of the propeller-turbine engine leads to a comparatively oversized nacelle.

A nacelle of such size has a correspondingly large frontal area, which, in turn, entails high aerodynamic nacelle drag. It should be noted in this context that propeller-turbine engines have a smaller airflow requirement, this resulting in low air throughput of the nacelle.

A further disadvantage of the known designs lies in the fact that the air intake ducts required have a relatively complicated shape. This results in a non-uniform field of flow in the air intake of the compressor, which, in turn, may become the main cause of compressor instability.

It should further be noted that the aerodynamic drag of the nacelles of an aircraft equipped with propeller-turbine engines can amount to more than 15 percent of the overall aircraft drag.

BRIEF SUMMARY OF THE INVENTION

In a broad aspect, the present invention provides an air intake system of a propeller-turbine engine with in-line arrangement of a propeller gearbox which combines a reduction of the aerodynamic drag of the nacelle with stable compressor operating conditions of the gas turbine, while being of simple design and form.

It is a particular object of the present invention to provide remedy to the above problem by the features described herein, with further advantages and aspects of the present invention becoming apparent from the description below.

The present invention accordingly provides one or several intake units arranged essentially below a nacelle fairing of the propeller-turbine engine, with a diffuser being related to each intake unit by way of which the flow of air supplied is fed into a rotationally symmetric attenuation chamber which is connected to the compressor inlet of the propeller-turbine engine.

The air intake system according to the present invention is characterized by a variety of merits.

The air intake units according to the present invention, which preferably have the form of so-called NACA air intakes, are arranged essentially under the nacelle fairing. This enables the outer configuration of the nacelle to be optimized and its drag resistance to be reduced.

The in-line arrangement of propeller-turbine engine and propeller gearbox is highly favorable in terms of the space occupied by them, this providing for a smaller overall diameter of the nacelle fairing.

According to the present invention, the number of air intake units may be adjusted to the requirements, which means that between one and five of such intake units may be arranged on the nacelle fairing, for example.

In a particularly preferred form of the present invention, the respective intake unit is provided with a device for the deflection and diversion of the propeller hub boundary layer. Integration of said device for the deflection and diversion of the propeller hub boundary layer in the nacelle surface improves the in-flow characteristics of the intake unit.

In a further, particularly advantageous form, the present invention provides for orientation of the intake units to the nacelle-related speed vector of the propeller flow. This allows the in-flow or by-flow characteristics of the nacelle to be appropriately taken into account to ensure optimum airflow into the intake units.

To reduce losses, it is particularly advantageous to provide each intake unit with a diffuser (elbow-type diffuser) downstream of its inlet cross-section. Such means of shock diffusion improves the inflow of air into the following attenuation chamber. The attenuation chamber ensures a uniform field of flow in the compressor inlet of the gas turbine. This results in stability of the compressor under all flight and load conditions of the propeller-turbine engine.

It is particularly favorable to arrange in the area of the diffuser (elbow-type diffuser) a branch to an inertia-type particle separator, with provision being made for its activation and de-activation.

All intake units of the propeller-turbine engine are connected to the rotationally symmetric attenuation chamber preferably by means of flexible sealing elements. This arrangement provides for a shock diffuser at each outlet of the elbow-type diffuser or each inlet of the attenuation chamber, respectively.

The above-described design, in particular the shock diffuser, separates the intake units from the engine compressor inlet. While this design generally incurs higher pressure losses at the intake of the propeller-turbine engine, the intake configuration so provided appreciably reduces the frontal area of the nacelle of the propeller-turbine engine. The consequential improvement in terms of the aerodynamic drag of the nacelle leads to a significant reduction in fuel consumption. In summary, the smaller frontal area of the nacelle together with lower interference losses provides for reduced fuel consumption, this contributing to the environmental friendliness of the engine and increasing the operating range of the aircraft.

As a further advantage of the present invention, the smaller size of the nacelle fairings provides for a weight reduction of the engine nacelles.

The essential advantage of compressor stability under all conditions of the propeller-turbine engine and all flight conditions has already been addressed above.

Furthermore, engine installation is facilitated by the separation of the nacelle intake (intake units) and the compressor inlet of the engine.

In addition, the attenuation chamber can be provided with secondary inlets for accessories or similar installations, for example oil coolers, cabin-air cooling and/or nacelle venting. Provision is here also made for a reduction of the overall number of secondary inlets.

BRIEF DESCRIPTION OF THE DRAWINGS

Further aspects and advantages of the present invention are described by way of an embodiment shown in FIG. 1, FIG. 2 and FIG. 3 of the accompanying drawings, in which.

DETAILED DESCRIPTION OF THE INVENTION

Figure 1:
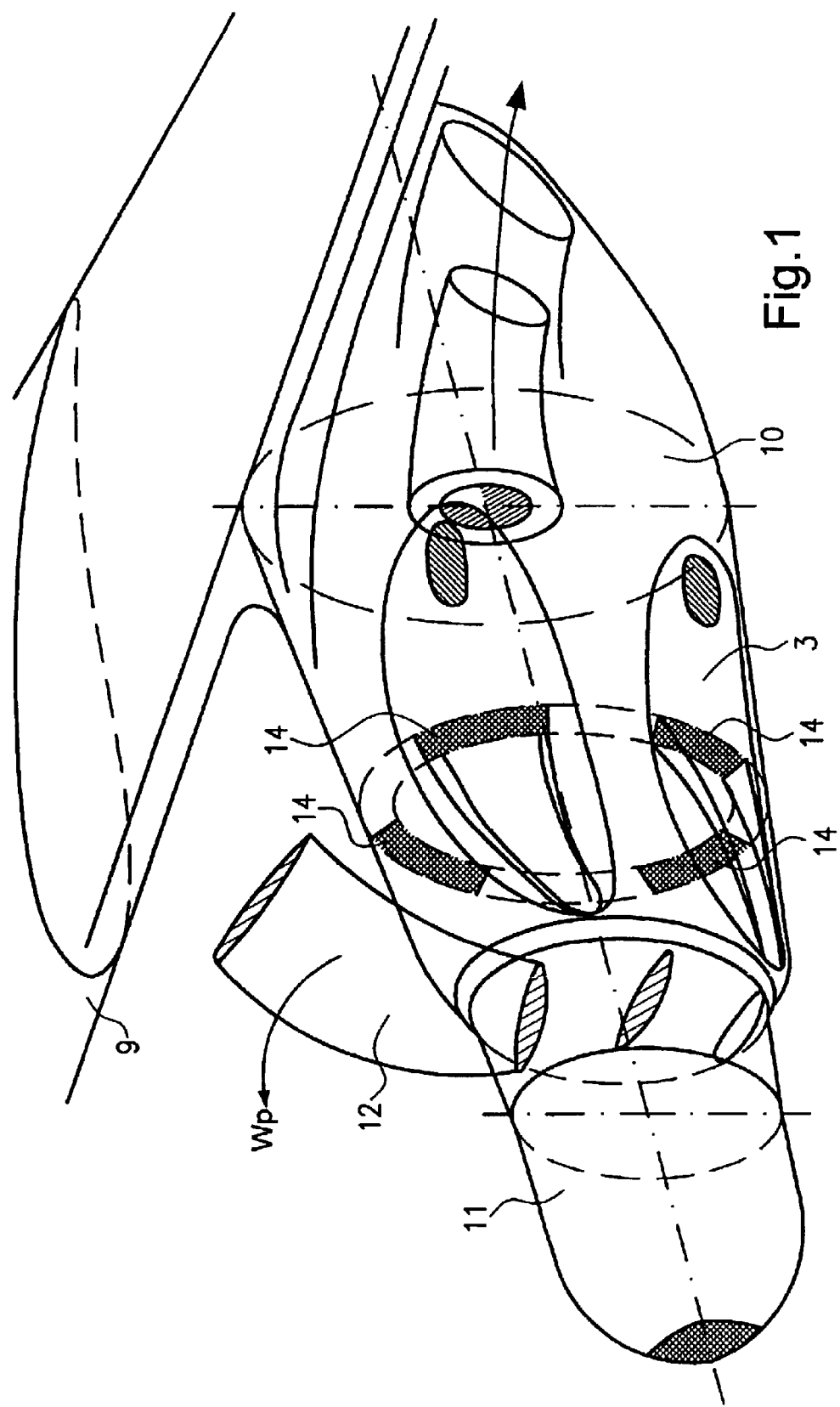
FIG. 1 is a simplified perspective view of a propeller-turbine engine with a nacelle on a wing of an aircraft.

This detailed description should be read in combination with the summary of the invention above, which is incorporated by reference here. First, FIG. 1 shows in simplified representation a portion of a wing 9 of an aircraft to which a nacelle 10 of a propeller-turbine engine is installed. A propeller hub 11 is shown at the front face. Second, FIG. 1 shows a portion of a propeller blade 12 in schematic representation.

As becomes further apparent from FIG. 1, a total of four intake units 3 are arranged on the circumference of the nacelle 10, these being partially integrated into the fairing of the nacelle 10.

For clarity of FIG. 1, representation of the gearbox, the gas turbine and other units has been dispensed with.

Figure 2:
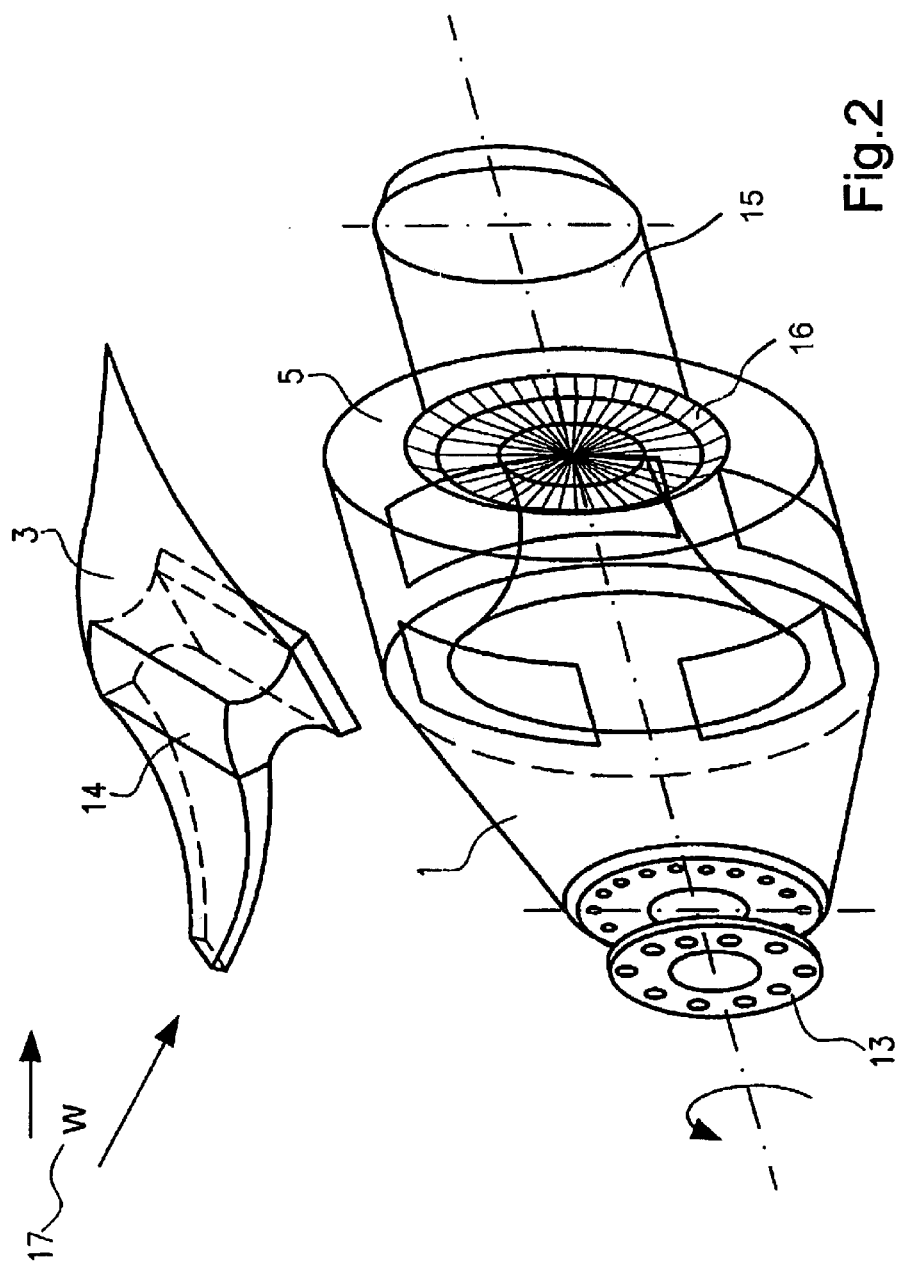
FIG. 2 is a perspective partial view of the air inlet configuration with several intake units according to the present invention, with the air intake units being evenly distributed on the circumference of a rotationally symmetric attenuation chamber and with the propeller gearbox and the engine being arranged in line.

FIG. 2 shows in enlarged perspective view an in-line arrangement of a propeller flange 13 and a downstream propeller gearbox 1. As on an exploded view, the intake unit 3 according to the present invention is shown separately, with reference numeral 14 indicating each of the corresponding inflow openings.

FIG. 2 further shows in schematic representation an annular attenuation chamber 5 by which the airflow is led to a compressor inlet stator 16 of a compressor 15.

Reference numeral 17 represents a nacelle-related speed vector of the propeller delivery flow, to which the intake unit 3 can be oriented.

Figure 3:
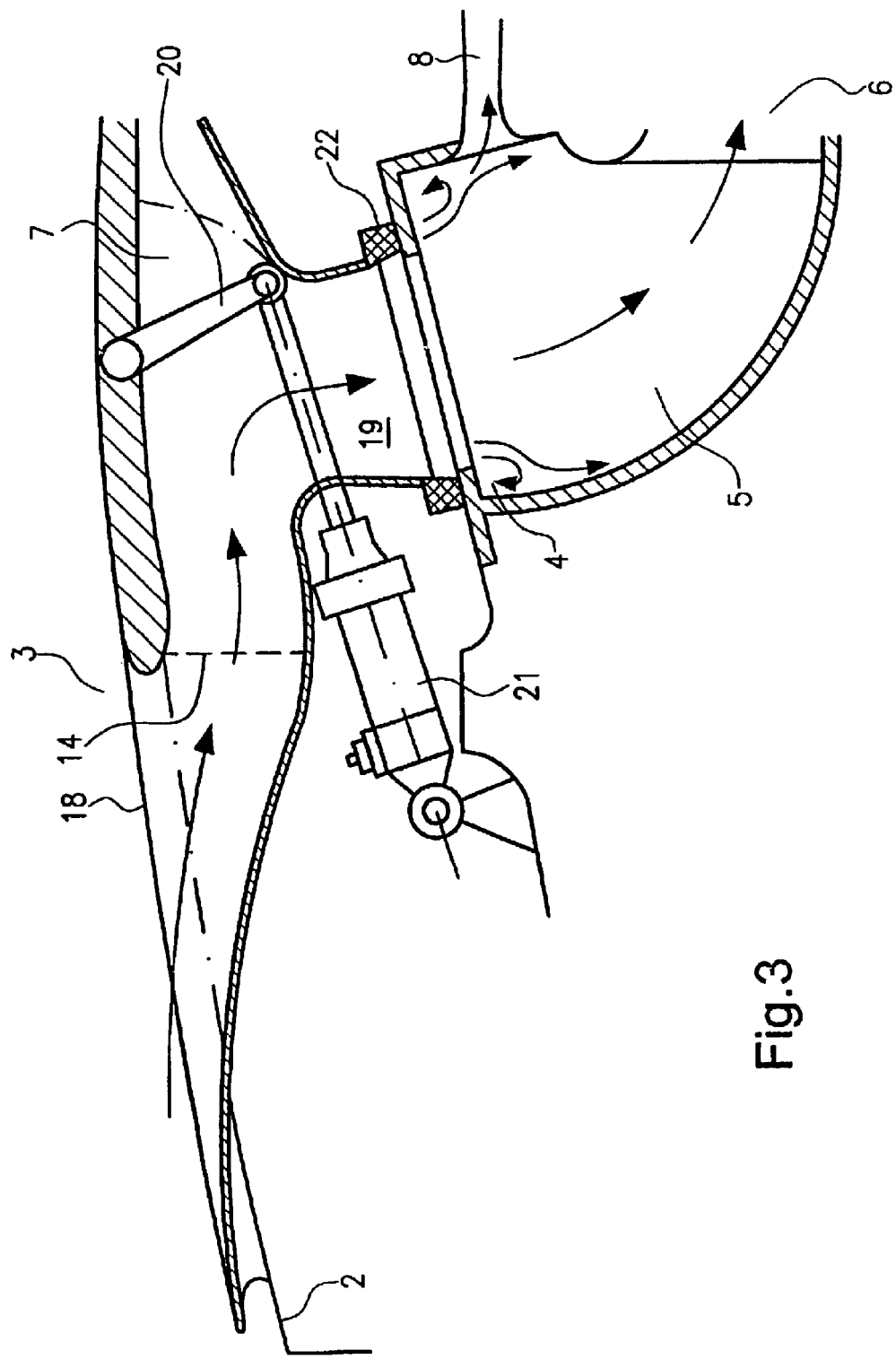
FIG. 3 is a simplified partial sectional view of the intake unit according to the present invention with shock diffuser and attenuation chamber.

FIG. 3 is a detail view of the configuration of the intake unit 3 according to the present invention. Reference numeral 2 indicates a portion of a nacelle fairing or of the surface of the nacelle, respectively. Reference numeral 18 indicates a NACA leading edge with an integrated device for the direction and deflection of the propeller hub boundary layer.

FIG. 3 shows the inflow of air. This inflow is deflected radially inwards into an elbow 19 with a diffuser. Shown in this deflection area is a branch 7 which leads to an inertia-type particle separator, with provision being made in this area for a flap 20 with a drive 21.

The intake unit 3 is connected to the attenuation chamber 5 by means of a flexible sealing element 22. This arrangement provides a shock diffuser 4 to the attenuation chamber. Shown on the attenuation chamber 5 are a compressor inlet 6 and a secondary outlet for the delivery of secondary air.

It is apparent that a plurality of variations and modifications other than described herein may be made to the embodiments here shown without departing from the inventive concept.

What is claimed is:

1. An air intake system of a propeller-turbine engine having a propeller gearbox in in-line arrangement, comprising:

at least one intake unit arranged essentially below a nacelle fairing of the propeller-turbine engine, a diffuser flowingly connected to each intake unit, and a rotationally symmetric attenuation chamber that is rotationally symmetric with the engine and into which each respective diffuser issues and which is flowingly connected to a compressor inlet of the propeller-turbine engine.

2. An air intake system in accordance with claim 1, wherein the intake unit includes a device for deflecting and diverting a propeller hub boundary layer.

3. An air intake system in accordance with claim 2, wherein the intake unit is oriented to a nacelle-related speed vector of the propeller flow.

4. An air intake system in accordance with claim 3, wherein the diffuser is an elbow-type diffuser.

5. An air intake system in accordance with claim 4, wherein the intake unit includes a branch to an inertia-type particle separator.

6. An air intake system in accordance with claim 5, wherein the attenuation chamber includes at least one secondary outlet.

7. An air intake system in accordance with claim 6, wherein the intake unit is designed in the form of a NACA air intake.

8. An air intake system in accordance with claim 7, and further comprising a plurality of intake units distributed around a circumference of the nacelle.

9. An air intake system in accordance with claim 3, wherein the diffuser is a shock diffuser.

10. An air intake system in accordance with claim 9, wherein the intake unit includes a branch to an inertia-type particle separator.

11. An air intake system in accordance with claim 10, wherein the attenuation chamber includes at least one secondary outlet.

12. An air intake system in accordance with claim 11, wherein the intake unit is designed in the form of a NACA air intake.

13. An air intake system in accordance with claim 12, and further comprising a plurality of intake units distributed around a circumference of the nacelle.

14. An air intake system in accordance with claim 1, wherein the intake unit is oriented to a nacelle-related speed vector of the propeller flow.

15. An air intake system in accordance with claim 1, wherein the diffuser is an elbow-type diffuser.

16. An air intake system in accordance with claim 1, wherein the diffuser is a shock diffuser.

17. An air intake system in accordance with claim 1, wherein the intake unit includes a branch to an inertia-type particle separator.

18. An air intake system in accordance with claim 1, wherein the attenuation chamber includes at least one secondary outlet.

19. An air intake system in accordance with claim 1, wherein the intake unit is designed in the form of a NACA air intake.

20. An air intake system in accordance with claim 1, and further comprising a plurality of intake units distributed around a circumference of the nacelle.

* * * * *